United States Patent [19]

Bell et al.

[11] 4,448,847

[45] May 15, 1984

[54] PROCESS FOR IMPROVING STEEL-EPOXY ADHESION

[75] Inventors: James P. Bell, Storrs, Conn.; Anthony J. De Nicola, Jr., Newark, Del.

[73] Assignee: Shell Oil Company, Houston, Tex.

[21] Appl. No.: 382,986

[22] Filed: May 28, 1982

[51] Int. Cl.³ ............................................. B32B 27/38
[52] U.S. Cl. .................................. 428/413; 428/418; 428/457; 427/302; 427/327; 427/386; 148/6.24; 148/6.14 R; 156/316; 156/330; 526/62
[58] Field of Search ...................... 427/302, 327, 386; 526/62; 428/418, 457, 413; 148/6.24, 6.14 R; 156/281, 316, 330; 252/142

[56] References Cited

U.S. PATENT DOCUMENTS

| | | | |
|---|---|---|---|
| 2,640,037 | 5/1953 | Parry et al. | 260/42 |
| 2,651,589 | 9/1953 | Shokal et al. | 154/140 |
| 2,658,885 | 11/1953 | D'Alelio | 260/53 |
| 3,336,241 | 8/1967 | Shokal | 260/2 |
| 3,477,990 | 11/1969 | Dante et al. | 260/47 |
| 3,756,984 | 9/1973 | Klaren et al. | 260/47 EC |
| 4,059,473 | 11/1977 | Okami | 427/302 X |

*Primary Examiner*—Alexander Thomas

[57] ABSTRACT

The present invention is directed to a method for improving the adhesion of epoxy resins to steel substrates which comprises first removing the oxide surface layer, preferably by chemical means, and then pretreating the substrate with a solution of at least one coupling agent selected from the group consisting of $\beta$-diketones and mercaptoesters. The invention also provides a method for improving the adhesion of epoxy resins to steel substrates by preheating with citric acid or a salt thereof.

18 Claims, No Drawings

PROCESS FOR IMPROVING STEEL-EPOXY ADHESION

FIELD OF THE INVENTION

The present invention is directed to improving the adhesion of epoxy resin compositions, particularly adhesive compositions to steel substrates.

BACKGROUND OF THE INVENTION

Epoxy resins are of particular interest for metal to metal bonding because of their high strength and ability to adhere strongly to metal surfaces. Epoxy resins possess a number of properties which make them uniquely suited for bonding structural components such as low viscosity, low shrinkage, high mechanical strength, flexible range of curing temperatures depending on curing agent selection, solventless curing process, and excellent chemical resistance.

Despite the unique combination of properties possessed by epoxy resins, their versatility has not been fully utilized. The use of epoxy resins has been generally limited to non-load bearing or low load bearing applications. There are a number of factors involved but one of the major reasons is the bond sensitivity of these resins to high humidity or water, particularly hot water. The strength of dry epoxy/metal systems is typically adequate for most structural applications.

There are a number of potential applications where epoxy resins could be used to bond steel substrates of the water sensitivity problem were solved, such as in the automobile and bridge industries.

SUMMARY OF THE INVENTION

The present invention is directed to a method for improving the adhesion of epoxy resins to steel substrates which comprises first removing the oxide surface layer, preferably by chemical means, and then pretreating the substrate with a solution of at least one coupling agent selected from the group consisting of $\beta$-diketones and mercaptoesters. The invention also provides a method for improving the adhesion of epoxy resins to steel substrates by pretreating with citric acid or a salt thereof.

DESCRIPTION OF THE PREFERRED EMBODIMENTS

The present invention is directed to a method for improving the adhesion of epoxy resins to steel substrates which comprises (1) chemically removing the oxide layer from said substrate and (2) pretreating said substrate with a solution of at least one coupling agent selected from the group consisting of $\beta$-diketones and mercapto-esters.

The present invention is particularly suitable for improving the bond strength between a steel substrate and a cured epoxy resin when the bond is subsequently exposed to humid conditions, especially when immersed in water. Outstanding adhesion is achieved when the pretreated steel-epoxy bond is exposed to hot or boiling water.

The iron oxide coating may be removed by any suitable technique before the substrate is pretreated with the coupling agent, including the use of cleaning agents normally utilized to clean steel substrates such as organic and mineral acids. However, a preferred method comprises pretreating the steel substrate with an aqueous solution of citric or oxalic acid or a salt thereof. Suitable compounds include sodium citrate, ammonium citrate, sodium oxalate, ammonium oxalate, etc. Especially preferred is ammonium citrate. In general, the citrate solutions will range from about 0.1% to about 10% by weight, although weaker or stronger solutions may be utilized. Preferred solution will range from about 1% to about 5% by weight. An excellent solution (ammonium citrate) comprises first preparing a 3% by weight aqueous solution of citric acid and then adjusting the pH by the addition of concentrated ammonium hydroxide. The pH of the resulting solution will generally range from about 5.5 to 9.5, although a pH of about 7 is preferred.

The steel is immersed in the ammonium citrate solution (or the other suitable chemical cleaner) for from about 5 minutes to about 1 hour at a temperature from about 20° to about 90° C. A very suitable time is about 10 minutes at 50°–70° C.

COUPLING AGENTS

Suitable coupling agents for pretreating the cleaned steel substrates include the $\beta$-diketones of the general formula:

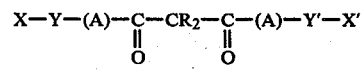

wherein R is H or an alkyl radical, Y and Y' are each (symetrical or assymetrical) aliphatic, cycloaliphatic or aromatic radicals, A is O, S, N, or $CH_2$, X and X' are each an OH (if aromatic), carboxyl, glycidyl, glycidyl ether, glycidyl ester or $—CH_2OH$ group.

Representative $\beta$-diketones include the following:

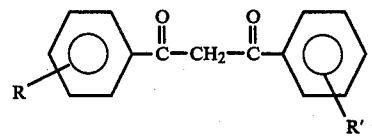

wherein
(1) R=R'=H; or
(2) R=H, and R' is —OH,

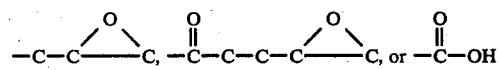

Suitable mercaptoesters include those of the general formula:

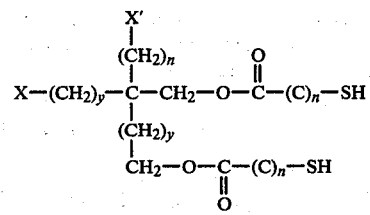

wherein X and X' are each H or

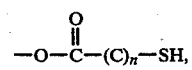

n=1, 2 or 3, and
y=0, 1, 2 or 3.

Typical examples of suitable mercaptoesters, among many others, include hexanetriol trithioglycolate, ethylmercaptoacetate, hexanetriol trimercaptobutyrate, β-mercaptoethyl acetate, pentaaerythritol tetrathioglycolate, pentaaerythritol tetramercaptopropionate and ethylene glycol dimercaptoacetate, diethylene glycol dimercaptoacetate, glycerol trimercaptoacetate, etc.

In general, after the steel substrate has been chemically cleaned it is immersed in a solution of one or more of the above coupling agents. The strength of the solution will vary widely, but will usually range from about 0.001 to about 0.1 molar solution. Suitable solvents include water; ketones such as acetone, MIBK, MEK, etc.; alcohols such as ethanol and isopropanol; glycol ethers, esters and the like. Preferred are the polar solvents. The steel substrate is immersed in the solution for from about 10 seconds to about 10 hours, although longer or shorter times may be employed depending on the cleaning technique, the particular coupling agent employed, solution temperature, etc. In general, the solution will range from about 15° C. to about 100° C.

After the steel substrate has been cleaned and pretreated with the coupling agent by any suitable means such as immersion, dipping, spraying, painting, etc., the substrate is rinsed and dried and an epoxy-curing agent and/or curing accelerator blend is applied thereto using any conventional technique such as painting, dipping, doctor blade, fluidized bed, electrostatic, etc., and cured.

The epoxy adhesive which may be employed forms no part of the present invention and any of the epoxy-curing agent curing accelerator compositions normally utilized as an adhesive or coating for metal substrates are suitable.

Polyepoxides

Suitable polyepoxides which may be used in adhesive compositions include those compounds possessing more than one vic-epoxy group per molecule, i.e., more than one

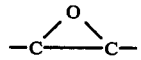

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. As used herein the terms "epoxide equivalent weight" and "weight per epoxide" (WPE) refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 39 to column 4, line 75) and it is to be understood that so much of thedisclosure of that patent relative to examples of polyepoxides is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight (WPE) between about 140 and 2,000. Especially preferred are the diglycidyl polyethers of 2,2-bis(4-hydroxyphenyl)propane having a WPE between about 140 and 500 and an average molecular weight of from about 300 to about 900.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This methods is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is hydrogenated Bisphenol A, the resulting saturated epoxy compound is sometimes referred to as "diepoxidized hydrogenated Bisphenol A," or more properly as the diglycidyl ether of 2,2-bis(4-cyclohexanol)propane.

In any event, the term "saturated epoxy resin," as used herein shall be deemed to mean the glycidyl ethers of polyhydric phenols wherein the aromatic ring structure of the phenols have been or are saturated.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., the glycidyl phenol-aldehyde condensates, as described in U.S. Pat. No. 2,658,885.

Epoxy Curing Agent

Suitable epoxy curing agents include the alkaline and acidic materials which are normally epoxy curing agents. Examples of suitable curing agents include, among others, the polybasic acids and their anhydrides, such as, for example, the di, tri- and higher carboxylic acids as oxalic acid, phthalic acid, terephthalic acid, succinic acid, alkyl and alkenyl-substituted succinic acids, tartaric acid, and particularly the polymerized unsaturated acids, such as, for example, those containing at least 10 carbon atoms, and preferably more than 14 carbon atoms, as for instance dodecenedioic acid, 10,12-eicosadienedioic acid, and anhydrides as phthalic anhydride, succinic anhydride, maleic anhydride, nadic anhydride, pyromellitic anhydride and the like.

Other types of acids that are useful are those containing sulfur, nitrogen, phosphorus or halogens; benzene phosphinic, sulfonyl dipropionic acid bis(4-carboxyphenyl)amide.

Other preferred curing agents include the amino-containing compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N-N-diethyl-1,3-propane diamine, 1,2-diamino-2-methylpropane, 2,3-diamino-2-methylbutane, 2,3-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, tetramethylpentane, meta-phenylene diamine and the like, and soluble adducts of amines and poly-epoxides and their salts, such as described in U.S. Pat. Nos. 2,651,589 and 2,640,037. Still other examples include the acetone soluble reaction products of polyamines with unsaturated nitriles, such as acrylonitrile, imidazoline compounds as obtained by reaction monocarboxylic acids with polyamine, sulfur and/or phosphorus-containing polyamines as obtained by reacting a mercaptan or phosphine containing active hydrogen with an epoxide halide to form a halohydrin, dehydrochlorinating and then reacting the resulting product with a polyamide, soluble reaction product of polyamines with acrylates, and many other types of reaction products of the amines.

Still other curing agents that may be used include boron trifluoride and complexes of boron trifluoride with amines, ethers, phenols and the like, Friedel Crafts metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orthothiophosphate, diethyl orthophosphate and hexaethyletetraphosphate and the like.

Another type of curing agent to be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids as described above. Amines used in making the polyamides include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably 20 to 250 poises at 40° C. Preferred polyamides also have amine values of 50 to 450. Preferred polyamides also have amine values of 50 to 450.

Still another group of curing agents are those based on melamine reaction products containing methylol substituents.

Still other suitable curing agents comprise the imidazoles and benzimidazoles as well as adducts thereof with epoxy resins. Suitable such imidazoles and adducts therefrom are described in U.S. Pat. No. 3,756,984.

Especially preferred epoxy curing agents are the amino-containing compounds such as the aliphatic, cycloaliphatic, aromatic amines and polyamines as well as the polyamides and the like.

The amount of curing agent may vary considerably depending upon the particular agent employed. In general, the acids, anhydrides, polyamides, polyamines, polymercaptans, etc., are preferably utilized in at least 0.6 chemical equivalent amounts, and preferably 0.8 to 2.0 equivalent amounts. An equivalent amount refers to that amount needed to give one active H (or anhydride group) per epoxy group.

Various conventional additives may be included in the epoxy adhesive blend such as solvents, curing agent accelerators, antioxidants, fungicides, diluents, pigments, fillers, fibrous materials, dyes, resins, polyolefins, plasticizers, extenders, etc.

The temperature employed in the cure will vary depending chiefly on the type of curing agent. The amino-containing curing agents generally cured at or near room temperature although temperature up to about 120° C. may be used. The acids, anhydrides, and melamine derivatives, on the other hand, are generally used for heat cures, such as temperatures ranging from 100° C. to about 250° C. Preferred temperatures range from about 60° C. to about 150° C.

To illustrate the manner in which the invention may be carried out, the following examples are given. It is understood, however, that the examples are for the purpose of illustration only and that the invention is not to be regarded as limited to any of the specific conditions or reactants recited therein. Unless otherwise indicated, parts and percentages are by weight.

Polyepoxide A is a glycidyl polyether of 2,2-bis(4-hydroxyphenyl)propane having an average molecular weight of 380 and an epoxy equivalent weight of 185–195.

MDA is methylenedianiline.

VERSAMID 140 TM is a commercially available polyaminoamide derived from the condensation of dimer fatty acids and polyamines.

PETG is pentaerythritol tetrathioglycolate.

PETMP is pentaerythritol tetra-3-mercaptopropionate.

HTTMB is 1,2,6-hexanetriol tetra-4-mercaptobutyrate.

HTTHG is 1,2,6-hexanetriol trithioglycolate.

DMP-30 has the following structural formula:

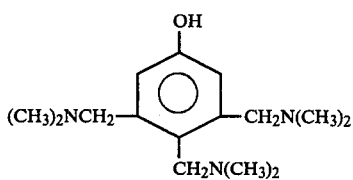

The following typical experimental procedures were used in the examples.

A. Chemical Pretreatment (e.g. Ammonium Citrate)
(1) Citric acid (30 g) is dissolved in 1000 ml of distilled water.
(2) The pH of the solution is adjusted by the addition of concentrated ammonium hydroxide.
(3) The ammonium citrate solution is heated to 80° C. with stirring on a heating source.
(4) The hot solution is poured into a beaker containing the steel joints.
(5) The joints are exposed to the hot ammonium citrate solution at a temperature of 50° to 70° C. for 10 minutes.
(6) The joints are removed and immediately immersed in distilled water and then in methanol.
(7) They are then immediately transferred to the coupling agent solution.

B. Coupling Agent Treatment

The adhesive joint surfaces are treated by totally immersing the joint in an organic solution of the coupling agent and heating to reflux for 15 minutes. A general treatment procedure is given below:
(1) Clean and polish joint surfaces.
(2) Make up fresh solutions of the coupling agent in a suitable solvent.
(3) A 500 ml resin kettle and appropriate heating mantel are used. The joints are placed in the solution and heat is applied to cause refluxing of the solution.
(4) The joints are removed and immersed in pure solvent for about one minute.
(5) The adhesive is applied approximately ½ hour after treatment.

C. Immersion Testing

All durability testing was done in distilled water at 57° C. A controlled water bath maintained at 57° C. was used. To reduce evaporation, a small amount of vacuum pump oil was added to the bath water. This allows continuous heating of the water bath for approximately a week without having to replace water.

The adhesive joints are placed vertically in a beaker and distilled water is added. The water level is maintained above the height of the joints. Aluminum foil is placed over the top of the beaker and holes are poked into it to allow air to enter. The beaker is lowered into the water bath. The temperature of the bath can be controlled to ±0.5° C.

D. Adhesive Joint Geometry

A modified napkin ring or tubular butt joint geometry developed by Lin and Bell, J. Appl. Poly. Science, 16, 1721 (1972), was used to test the shear strength of the epoxy/steel adhesive systems. The adhesive joints uses a very short tube mounted on a solid rod which minimizes axial stress components in the joint due to distortion of the tube. A small vent hole in the interior of the joint compensates for gas expansion inside the annular ring and allows water penetration from the interior and exterior of the joint. The maximum radial diffusion distance is 0.08 cm. This is the distance water would have to diffuse in order to completely cover the interface. The joints are composed of 1018 mild steel.

Prior to use the joint surfaces are carefully polished with 600 grit emory cloth on a lathe. The desired amount of Polyepoxide A and curing agent are weighed with extreme care to eliminate variations in joint strength due to changes in the resin mixture. When methylenedianiline is used as the curing agent, the polyepoxide and MDA are heated to 120° C. prior to mixing. Methylenedianiline is a solid at room temperature and must be melted prior to use. Polyepoxide A and liquid MDA are mixed together at 120° C. and vigorously stirred with a spatula until the solution is clear and free of air bubbles (approximately one minute). The mixture is then cooled to room temperature.

When resorcinol is used to accelerate curing, it is completely dissolved in polyepoxide at 100° C. The mixture is cooled to room temperature, then Versamid 140 is added. The mixture is vigorously stirred with a spatula. A small amount of heat is applied with a heat gun to lower the viscosity while mixing. Stirring is continued until the mixture is clear and free of air bubbles.

The resin mixture (44 mg) is applied to the ring of the joint with a 1 ml disposable syringe and large diameter needle. The resin is measured by weighing the ring half of the joint prior to and after coating. The two halves of the joint are mated and a 1018 carbon steel sleeve is placed around the joint to ensure proper alignment. The gap spacing between the joint halves is 0.010 inches. The spacing is checked prior to using the joint.

When high temperature curing agents are used the joints are placed in an oven with accurate temperature control. A leveling plate is placed in the oven to ensure exact vertical positioning of the joints. At the completion of the curing cycle, the joints are cooled slowly by opening the door of the oven slightly. It takes approximately 3 hours for the joints to reach room temperature when a 150° C. cure is used.

E. Torsional Test

After immersing in distilled water at 57° C. for the desired amount of time, the joints were taken out, tissued dried, and allowed to cool to room temperature in air.

The torsional test was conducted on an Instron Universal Testing Machine, Model TM-S. Torque was applied to the joint via a torsion device manufactured by Instron as part of the Instralab series. The device converts the vertical cross-head motion to a torsional stress by means of a metal strap wound on a low-friction pulley.

Stress is applied to break at 0.2 in/min cross-head speed (1.6%/min strain rate). An external X-Y recorder is used to accept the signal from a 1000lb reversible load-cell amplifier. The force to break is recorded in pounds. Applied torque, Mt, is related to the maximum shear stress, tmax, by the following (71):

$$t_{max} = \frac{16 \cdot M_t \cdot D_o}{\pi(D_o^4 - D_i^4)},$$

where Di and Do are inner and outer diameters of the raised annular ring, respectively.

F. Water Absorption

Water uptake studies of cured epoxy resins were conducted. Two sample thicknesses were examined:

(1) 0.04 cm epoxy samples
(2) 0.16 cm epoxy samples

Samples were prepared from cured epoxy plates. Extreme caution was taken to ensure that residual release agent did not come off onto the epoxy surface. The release agent was wiped off of the glass plates prior to use so that only a very thin layer remained.

Samples were in the form of strips. These were labeled and placed in distilled water at 57° C. Initial dry weight was determined. After soaking for the desired period of time, the samples were removed, tissue dried, and immediately weighed. Percent water uptake is determined by dividing the difference between initial and final weights by the initial weight:

$$\% \text{ Water Uptake} = \frac{\text{Final wt.} - \text{Initial wt.}}{\text{Initial wt.}}$$

G. Casting and Curing Techniques

Various samples for mechanical testing of the bulk resin properties were cut from cured epoxy plates. General procedures for preparing these plates are given below.

(a) Versamid 140 Plates

The required amount of epoxy resin was weighed into an aluminum sample dish. If resorcinol was used it was weighed and added to the resin (0.2 phr). The mixture was heated to 120° C. to melt the resorcinol and then hand mixed for approximately one minute. This mixture was poured into a resin kettle equipped with a stirring apparatus and capable of holding a vacuum. Versamid 140 was weighed out and poured on top of the resin mixture. Air bubbles were degassed from the mixture by applying vacuum to the kettle. After approximately 10 minutes the mixture was vigorously stirred with slight warming to reduce the viscosity. Once the mixture became clear and free of air bubbles the apparatus was disassembled and the resin was poured into a cast. The resin was cured at room temperature.

The cast consists of the following parts:
(a) Bottom glass plate ¼" thick
(b) C-clamps with adjustable screws
(c) Flexible rubber gasket
(d) Top glass plate ¼" thick The glass plates were coated with a film of release agent prior to casting. An oligomeric fluorocarbon type agent, MS-136 by Miller Stephenson was used. The release agent was sprayed on the glass surface as a thin film. For water absorption studies the release agent was wiped off with a tissue to provide a thin layer which would prevent sticking without leaving residue on the surface of the cured epoxy samples.

(b) Methylenedianiline Plates

The general procedure used with the VERSAMIDE 140 cured epoxy sample was used. The resin and curing agent were weight out separately. Both were heated to 120° C. and then hand mixed until the mixture was clear and free of air bubbles. The clear mixture was then poured into a mold and placed in a temperature controlled oven for curing. The plates were cured at 120° C. for one hour and at 150° C. for two hours. The cured epoxy plates were slowly cooled down to room temperature by opening the oven slightly. The plates take approximately three hours to cool to room temperature when this technique is used.

Tensile testing of Versamid 140 dog bone samples was conducted to examine the effect of water immersion on the tensile strength of the bulk resin. The samples were cut from the plates into strips and machined to standard shapes in the following manner:

(1) The plate was cut into long strips, 0.52 to 0.54 inches wide on a Do A11 band saw.
(2) The two sawed edges of the strips were ground to the exact dimensions (0.500±0.002 in) by the use of an abrasive wheel.
(3) The strips (1.5 mm thick) were milled to standard dog-bone shape, ASTM D638-68.

The dog bone samples were immersed in distilled water at 57° C. After the required amount of time they were taken out, dried, and allowed to cool to room temperature. An Instron Universal Testing Machine, Model TM-S was used to break the samples. A 1000lb reversible load cell amplifier was used. The signal was recorded on an X-Y recorder. Cross-head speed was 0.2 in/min.

The glass transition temperature of Versamid 140 samples was measured by Rheovibron. This "mechanical" determination of Tg is accurate and reliable. A complete description of the testing procedure is provided in the "Direct Reading Dynamic Visoelastometer-Instruction Manual," Model DDV-II-C No. 68 (1973).

Epoxy sample thickness was approximately 0.04 cm. Samples 5.00 cm long and 0.38 cm wide were cut from the plate with a razor blade.

Measurements of tan δ were done at $11H_z$ and $110H_z$ in the same run. The temperature of the test ranged from 25° C. to 120° C. Duplicate runs with the same samples were done to examine the effect of temperature on the Tg of the room temperature cured resin.

The shear strength of Versamid 140 and Methylenedianiline cured samples was determined. The effect of water immersion on the bulk resin shear strength was examined for comparison with torsional joint data. A punch-type shear test apparatus (ASTM D732-46) was used.

The fixture is constructed in such a way as to rigidly clamp the specimen both to the stationary block and movable plunger. Test specimens were cut from 0.04 cm thick epoxy cast plates. A hole ¼" in diameter was drilled through the center of the specimen. The specimen fits over a ¼" pin attached to the plunger and a nut is tightened onto the pin. The two halves of the testing fixture are placed together. Two pins on the stationary block ensure proper alignment. Four bolts are tightened, clamping the upper and lower blocks together with the test specimen between them.

Shear testing is accomplished by placing the testing fixture on top of the cross-head of an Instron Tensile Tester, Model TM-S. A 100lb reversible load-cell, bolted to the top of the instrument, was used to determine breakage force. A cross-head speed of 0.2 in/min was used. The punch was pushed far enough downward so that the shoulder cleared the specimen proper. Shear strength (PSI) is calculated by the following:

$$\text{Shear Strength} = \frac{\text{Breakage Force}}{2\pi r \cdot t},$$

where r is the radius of the punch and t is the thickness of the sample.

EXAMPLE I

This example illustrates the preparation of 1-(o-hydroxyphenyl)-3-phenyl-1,3-propanedione. To a solution of o-hydroxyacetophenone (4.0 ml) and benzoyl chloride (6.0 ml) in 200 ml of acetone, potassium carbonate is added. After 48 hours of refluxing under strictly anhydrous conditions, the reaction is complete. The reaction is monitored by thin layer chromatography (chloroform). The completion of the reaction is determined by the formation of one spot on silica gel. The solution appears bright yellow.

The solution is filtered to remove insoluble potassium carbonate and potassium chloride. The supernatant liquid is extracted with dilute aqueous acetic acid to decompose the potassium, salt of the product. After drying with potassium chloride, the solvent is stripped on a rotary evaporator, yielding 5 grams of the bright yellow product.

1-(o-hydroxyphenyl)-3-phenyl-1,3-propanedione (hereinafter HO-B-diketone) is purified by recrystallization from methanol. NMR, IR, and GV-mass spec. analysis confirm the expected structure.

EXAMPLE II

This example illustrates the preparation of 1,3-diphenyl-1,3-propanedione (dibenzoylmethane).

A THF solution of acetophenone (6.2 g) is added to a tetrahydrofuran suspension of $NaNH_2$ (4.0 g). The mixture is stirred at room temperature for ten minutes. Ethyl benzoate (15.5 g) is then added to the mixture. A gelatinous precipitate forms over the course of 24 hours. The mixture is added to an aqueous solution of HCl to neutralize the sodium amide and the sodium salt of the $\beta$-diketone. The mixture is then extracted with chloroform. The organic layer is stripped on a rotary evaporator. 1,3-diphenyl-1,3-propanedione is isolated from the residue by precipitating its copper salt. Decomposition of the complex with HCl yields the desired product in pure form. NMR analysis confirms the expected structure.

EXAMPLE III

This example illustrates the preparation of hexanetriol trithioglycolate (HTTHG).

Eighteen grams of 1,2,6-Hexanetriol and 37.5 grams of mercaptoacetic acid are added to 30 ml of toluene in a round bottom flask. The mixture is heated with stirring at 120° C. under a nitrogen atmosphere. Water formed during the reaction is stripped off as an azeotrope with toluene. After two hours of reaction the toluene/water mixture is allowed to distill completely and 50 ml of xylene is added. The temperature is raised to 150° C. Again, water formed during the reaction is stripped off as an azeotrope of xylene. After 4 hours water is no longer evident in the distilled phase.

Vacuum is applied at 160° C. to drive off excess reagents. This is continued for approximately one hour. The resultant product, a clear viscous liquid, is washed repeatedly with distilled water, separated, and then mixed with an equal amount of chloroform (45 ml). The solution is freed of water by adding NaCl and then filtered. Evaporation of the chloroform yields approximately 35 ml of the product.

NMR analysis confirms the expected structure, with a SH to OH ratio of 15 to 4. This corresponds to a SH functionality of 2.4 versus 3.0 for a theoretical maximum.

EXAMPLE IV

This example illustrates the preparation of ethylmercaptoacetate. 2-chloroacetyl chloride (15 ml) is added to ethanol (100 ml). Potassium carbonate is added. The solution is stirred at room temperature for one hour. After filtering off potassium carbonate the excess ethanol is stripped on a rotary evaporator. The residue is added to 40 ml of toluene and the solution is washed with water. Toluene is stripped on an evaporator yielding 15 ml of ethylchloroacetate.

NaSH (20 g) is dissolved in 200 ml of refluxing acetone. Ethylchloroacetate (10 ml) is added in two parts. After 3 hours of reaction toluene (400 ml) and water (200 ml) are added. The toluene layer is isolated and repeatedly washed with water. The solvent is stripped on an evaporator, yielding 8 ml of ethylmercaptoacetate. NMR analysis confirms the expected structure.

EXAMPLE V

This example illustrates the preparation of hexanetriol trimercaptobutyrate (HTTMB) 4-chlorobutyrylchloride is added to 1,2,6-hexanetriol and the procedure for synthesizing ethylmercaptoacetate as described in Example IV is followed.

EXAMPLE VI

This example illustrates the improved bonding strength (shear strength) of a methylenedianile (MDA)/Polyepoxide A adhesive on steel when (1) pretreated with hexanetriol trithioglycolate (HTTHG) and (2) when chemically cleaned with aqueous ammonium citrate prior to pretreatment with HTTHG.

The shear strengths of the resulting joints using various pretreatments are tabulated as follows:

Pretreatment: Test A: Polished with 600 grit. Treated with HTTHG in a refluxing solution (methanol) for ¼ hour.

Test B: Polished with 600 grit, then treated with a 3% aqueous ammonium citrate (pH 7.0) solution. Subsequent treatment with HTTHG in methanol for 15 minutes.

Test C: Polished with 600 grit. The joint surface was then sandblasted with Microbead glass-shot medium grade abrasive.

Adhesive: 25.6 parts MDA+100 parts Epon 828.
Cure: 1 hour at 120° C., 2 hours at 150° C.

| Joint No. | Shear Strength (psi)* | | |
|---|---|---|---|
| | Test A | Test B | Test C |
| 1 | 4300 | 8600 | 1600 |
| 2 | 4600 | 7100 | 1600 |
| 3 | 2600 | 7700 | 1500 |
| Average: | 3800 | 7800 | 1560 |

*Joints immersed in distilled water at 57° C. for 96 hours.

The data clearly shows that pretreatment of the steel with HTTHG significantly improves the shear strength of the Polyepoxide A/MDA adhesive joint. Even more improvement is achieved when the steel has been chemically cleaned prior to pretreatment with HTTHG.

EXAMPLE VII

This example illustrates the improved shear strength achieved by the present process with representative coupling agents. The procedures of Example VI were essentially repeated and the physical data is tabulated in Table I.

TABLE I

Adhesive: 25.6 parts MDA + 100 parts Polyepoxide A
Cure: 1 hour at 120° C., 2 hours at 150° C.

| Pretreatment | Shear Strength (psi)[1] |
|---|---|
| Control[2] | 0 |
| Sandblasting[2] | 1560 |
| Ammonium citrate[2] | 3900 |
| Ethylmercaptoacetate[2,3] | 4580 |
| HTTMB[2,3] | 7000 |
| HTTHG[2,3] | 6525 |
| PETG[2,3] | 6450 |
| PETMP[2,3] | 6525 |

[1] Joints were immersed in distilled water at 57° C. for 240 hours.
[2] Joints were polished with 600 grit emory cloth.
[3] Joints were treated with the coupling agents after a preactivation with ammonium citrate.

EXAMPLE VIII

This example illustrates the use of coupling agent hexanetriol tetramercaptobutyrate after chemical cleaning with ammonium citrate. The procedures of Example VI were essentially followed. The resulting data is as follows:

Pretreatment: Polished with 600 grit. Treated with a 3% aqueous ammonium citrate (pH 7) solution. Then treated with HTTMB in methanol.
Adhesive: 25.6 parts MDA+100 parts Polyepoxide A
Cure: 1 hour at 120° C., 2 hours at 150° C.

| Joint No. | Shear Strength (psi)* |
|---|---|
| 1 | 7100 |
| 2 | 6900 |
| 3 | 7050 |
| 4 | 6700 |
| 5 | 7400 |
| Average: | 7000 |

*Joints immersed in distilled water at 57° C. for 240 hours. Related results were obtained when an equivalent amount of VERSAMID 140 was used in lieu of the MDA.

EXAMPLE IX

This example illustrates the high shear strength obtained after pretreatment with PETG. The data is as follows:

Pretreatment: Test B: Polished with 600 grit. Treated with a 3% aqueous ammonium citrate solution made just prior to being used.
Coupling Agent: PETG in ethyl acetate.
Adhesive: 25.6 parts MDA+100 parts Epon 828.
Cure: 1 hour at 120° C., 2 hours at 150° C.

| Joint No. | Shear Strength (psi)* Test B |
|---|---|
| 1 | 5140 |
| 2 | 3950 |
| 3 | 5300 |
| Average: | 4800 |

*Immersed for 214 hours in distilled water at 57° C. Related results were obtained when an equivalent amount of VERSAMID 140 was used in lieu of MDA.

EXAMPLE X

The procedures of Example IX were repeated using PETMP. Related improvement in shear strength was observed (about 6000 psi after 9 days immersion at 57° C.).

EXAMPLE XI

This example illustrates the improvement in wet bond strength of representative β-diketones.

100 parts by weight of HO-β-diketone prepared as in Example I was cured with 50 parts by weight of VERSAMID 140 and 0.2 parts by weight of resorcinol. The adhesive joint surfaces were polished with 600 grit emory cloth approximately 1 hour prior to pretreatment by totally immersing the steel for 15 minutes in a refluxing acetone solution of HO-β-diketone ($4.0 \times 10^{-4}$ M). The pretreated steel panels were then immersed in pure solvent for approximately 1 minute and air dried. The shear strength after immersion for 1 day at 57° C. was about 5000 psi compared to less than 3000 psi for the untreated steel.

EXAMPLE XII

The procedures of Example XI were repeated wherein dibenzoylmethane (prepared as in Example II) was used as the coupling agent. A 3% aqueous ammonium citrate (pH 7) pretreatment was used followed by treatment with dibenzoylmethane in refluxing methanol ($2.5 \times 10^{-3}$ M). A significant improvement in bond durability was observed. The initial shear strength was 7500 psi and after four days water immersion at 57° C., the shear strength was about 5000 psi. The adhesive was Polyepoxide A/VERSAMID 140 system.

What is claimed is:

1. A method for improving the adhesion of epoxy resins to steel substrates which comprises (1) chemically removing the oxide layer from said substrate and (2) pretreating said cleaned substrate with a solution of at least one coupling agent selected from the group consisting of β-diketones of the general formula

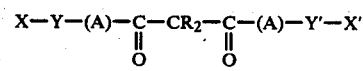

wherein R is H or an alkyl radical, Y and Y' are each (symetrical or assymetrical) aliphatic, cycloaliphatic or aromatic radicals, A is O, S, N, or $CH_2$, X and X' are each an aromatic OH, carboxyl, glycidyl, glycidyl ether, glycidyl ester or —$CH_2OH$ group and a mercaptoester of the general formula:

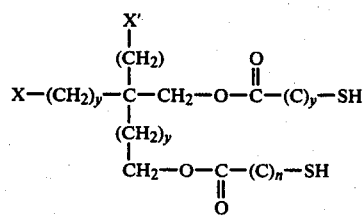

wherein X and X' are each H or

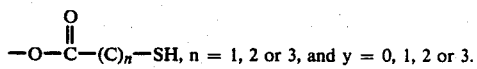

2. The method of claim 1 wherein the β-diketone has the general formula:

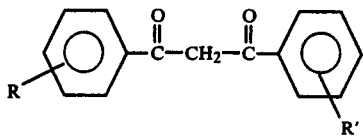

wherein
(1) R=R'=H; or
(2) R=H, and R' is —OH,

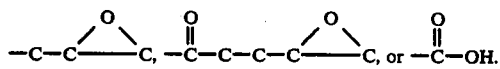

3. The method of claim 2 wherein the β-diketone is 1-(o-hydroxyphenyl)-3-phenyl-1,3-propanedione.

4. The method of claim 2 wherein the β-diketone is 1,3-diphenyl-1,3-propanedione.

5. The method of claim 1 wherein the mercaptoester is pentaaerythritol tetrathioglycolate.

6. The method of claim 1 wherein the mercaptoester is pentaaerythritol tetra-3-mercaptopropionate.

7. The method of claim 1 wherein the mercaptoester is 1,2,6-hexanetriol tetra-4-mercaptobutyrate.

8. The method of claim 1 wherein the mercaptoester is 1,2,6-hexane trithioglycolate.

9. The method of claim 1 wherein the coupling agent is employed in a 0.001 to 0.1 molar solution.

10. The method of claim 9 wherein the steel substrate is immersed in the coupling agent solution at from about 15° C. to about 100° C. for from about 10 seconds to about 10 hours.

11. The method of claim 1 wherein the oxide layer is removed by pretreatment with a solution of citric acid or a salt thereof.

12. The method of claim 11 wherein the solution is ammonium citrate.

13. The method of claim 11 wherein the solution has a pH of from about 5.5 to about 9.5.

14. The method of claim 11 wherein the solution is utilized at a temperature between about 50° and 70° C.

15. An article of construction comprising at least one steel substrate and an adhesive layer comprising a cured epoxy resin composition, said steel substrate being pretreated by the method of claim 1.

16. The article of claim 15 wherein the epoxy resin is a glycidyl polyether of 2,2-bis(4-hydroxyphenyl)propane.

17. The article of claim 15 wherein the epoxy curing agent is an amino-containing compound.

18. The article of claim 17 wherein the amino-containing compound is methylenedianiline.

* * * * *